United States Patent
Jia et al.

(10) Patent No.: US 11,785,661 B2
(45) Date of Patent: *Oct. 10, 2023

(54) CONFIGURATION METHOD AND APPARATUS FOR BEAM FAILURE RECOVERY AND COMMUNICATION SYSTEM

(71) Applicant: FUJITSU LIMITED, Kawasaki (JP)

(72) Inventors: Meiyi Jia, Beijing (CN); Guorong Li, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,714

(22) Filed: Oct. 24, 2022

(65) Prior Publication Data
US 2023/0037504 A1    Feb. 9, 2023

Related U.S. Application Data

(63) Continuation of application No. 16/910,753, filed on Jun. 24, 2020, now Pat. No. 11,659,612, which is a
(Continued)

(51) Int. Cl.
*H04W 76/19* (2018.01)
*H04W 28/06* (2009.01)
(Continued)

(52) U.S. Cl.
CPC .......... *H04W 76/19* (2018.02); *H04W 28/06* (2013.01); *H04W 72/23* (2023.01); *H04W 74/006* (2013.01)

(58) Field of Classification Search
CPC ... H04W 76/19; H04W 28/06; H04W 72/042; H04W 74/006; H04W 16/28; H04W 72/23; H04B 7/0695
See application file for complete search history.

(56) References Cited

U.S. PATENT DOCUMENTS

2012/0202431 A1    8/2012    Hawryluck et al.
2016/0295462 A1    10/2016    Lunden et al.
(Continued)

FOREIGN PATENT DOCUMENTS

CN    105745960 A    7/2016
CN    105790886 A    7/2016
(Continued)

OTHER PUBLICATIONS

Non-Final Office Action issued by the United States Patent and Trademark Office for corresponding U.S. Appl. No. 16/910,753, electronically delivered on Mar. 16, 2022. (Year: 2022).*
(Continued)

*Primary Examiner* — Michael K Phillips
(74) *Attorney, Agent, or Firm* — Myers Wolin, LLC (57) ABSTRACT

A configuration method and apparatus for beam failure recovery and communication system. The method includes: receiving configurations for beam failure recovery transmitted by a network device; the configurations at least include resource information and/or preamble information used to request a beam failure recovery; and removing at least a part of time frequency resources and/or preambles from the configurations used to request the beam failure recovery. Hence, the terminal equipment is able to remove or release resources and/or preambles of the dedicated configurations, validity of the resources and/or preambles in the dedicated configurations may be controlled, and the resources and/or preambles in the dedicated configurations may be utilized more efficiently at lower signaling overhead.

17 Claims, 6 Drawing Sheets

300

301 a terminal equipment receives configurations for beam failure recovery transmitted by a network device; the configurations at least include resource information and/or preamble information used to request a beam failure recovery

302 the terminal equipment removes at least a part of time resources and/or frequency resources from resources used to request the beam failure recovery, and/or removing at least a part of preambles from preambles used to request the beam failure recovery

Related U.S. Application Data continuation of application No. PCT/CN2018/071339, filed on Jan. 4, 2018.

(51) Int. Cl.
*H04W 74/00* (2009.01)
*H04W 72/23* (2023.01)

(56) References Cited

U.S. PATENT DOCUMENTS

| | | | |
|---|---|---|---|
| 2016/0353510 | A1 | 12/2016 | Zhang et al. |
| 2019/0037423 | A1* | 1/2019 | Yu ................. H04B 7/0695 |
| 2019/0053288 | A1 | 2/2019 | Zhou et al. |
| 2019/0053293 | A1 | 2/2019 | Akoum et al. |
| 2019/0075524 | A1* | 3/2019 | Zhou ................ H04W 16/32 |
| 2019/0090226 | A1 | 3/2019 | Wang et al. |
| 2019/0141546 | A1 | 5/2019 | Zhou et al. |
| 2019/0166539 | A1 | 5/2019 | Chen et al. |
| 2019/0166555 | A1 | 5/2019 | Cheng et al. |
| 2019/0200248 | A1 | 6/2019 | Basu Mallick et al. |
| 2019/0200249 | A1 | 6/2019 | Yoon et al. |
| 2019/0274169 | A1 | 9/2019 | Tsai et al. |
| 2019/0387440 | A1* | 12/2019 | Yiu ................. H04W 36/165 |
| 2020/0022126 | A1 | 1/2020 | You et al. |
| 2020/0099437 | A1 | 3/2020 | Harada et al. |
| 2020/0127883 | A1 | 4/2020 | Liu et al. |
| 2020/0177263 | A1 | 6/2020 | Zhang |
| 2020/0196327 | A1* | 6/2020 | Zhang ............... H04W 72/569 |
| 2020/0214035 | A1* | 7/2020 | Chen ................ H04W 74/006 |
| 2020/0322035 | A1 | 10/2020 | Shi et al. |
| 2020/0322813 | A1 | 10/2020 | Jia et al. |
| 2020/0367293 | A1 | 11/2020 | Zhang et al. |
| 2020/0373989 | A1 | 11/2020 | Yan et al. |
| 2020/0374960 | A1 | 11/2020 | Deenoo et al. |

FOREIGN PATENT DOCUMENTS

| | | |
|---|---|---|
| CN | 107005858 A | 8/2017 |
| CN | 107342801 A | 11/2017 |
| EP | 3 264 631 A1 | 1/2018 |
| WO | 2016/127403 A1 | 8/2016 |

OTHER PUBLICATIONS

Notice of Allowance issued by the United States Patent and Trademark Office for corresponding U.S. Appl. No. 16/910,753, electronically delivered on Jul. 25, 2022. (Year: 2022).*
First Notification of Office Action and Search Report issued by the China National Intellectual Property Administration for corresponding Chinese Patent Application No. 201880079170.X, dated Jan. 4, 2023, with an English translation.
Huawei et al., "Remaining details on beam failure recovery", Agenda Item: 7.2.2.4, 3GPP TSG-RAN WG1 Meeting 91, R1-1719423, Reno, USA, Nov. 27-Dec. 1, 2017.
Interdigital, Inc., "Remaining issues on beam recovery", Agenda Item: 6.2.2.4, 3GPP TSG-RAN WG1 Meeting NR#3, R1-1716469, Nagoya, Japan, Sep. 18-21, 2017.
International Search Report and Written Opinion of the International Searching Authority issued by the State Intellectual Property Office of the P.R. China for corresponding International Patent Application No. PCT/CN2018/071358, dated Aug. 23, 2018, with an English translation.
The partial supplementary European search report issued by the European Patent Office for corresponding European Patent Application No. 18898946.1-1220, dated Nov. 13, 2020.
Extended European search report with supplementary European search report and the European search opinion issued by the European Patent Office for corresponding European Patent Application No. 18898946.1-1216, dated Feb. 26, 2021.
Notice of Reasons for Refusal issued by the Japan Patent Office for corresponding Japanese Patent Application No. 2020-534900, dated Aug. 3, 2021, with an English translation.
Non-Final Office Action issued by the United States Patent and Trademark Office for corresponding U.S. Appl. No. 16/910,758, electronically delivered on Feb. 10, 2021.
Huawei et al., "Beam failure recovery", Agenda item: 7.1.2.2.2, 3GPP TSG-RAN WG1 Meeting #89, R1-1708135, Hangzhou, China, May 15-19, 2017.
Zte et al., "Discussion on beam recovery", Agenda item: 6.2.2.4., 3GPP TSG-RAN WG1 Meeting NR#3, R1-1715441, Nagoya, Japan, Sep. 18-21, 2017.
Ericsson, "Summary of email discussion [99#32] [NR] TP on RRM", Agenda item: 10.4.1.4.1., 3GPP TSG-RAN WG2 Meeting #99-bis, Tdoc R2-1711963, Prague, Czech Republic, Oct. 9-13, 2017.
International Search Report issued by the State Intellectual Property Office of the P.R. China for corresponding International Patent Application No. PCT/CN2018/071339, dated Sep. 25, 2018, with an English translation.
Written Opinion of the International Searching Authority issued by the State Intellectual Property Office of the P.R. China for corresponding International Patent Application No. PCT/CN2018/071339, dated Sep. 25, 2018, with an English translation.
Qualcomm Incorporated, "Beam recovery procedures", Agenda Item: 5.1.2.2.2, 3GPP TSG-RAN WG1 Meeting NR#2, R1-1711161, Qingdao, P.R. China, Jun. 27-30, 2017.
Samsung, "Beam failure recovery", Agenda Item: 5.1.2.2.2, 3GPP TSG-RAN WG1 Meeting NR Ad-hoc #2, R1-1710655, Qingdao, P.R. China, Jun. 27-30, 2017.
Notice of Reasons for Refusal issued by the Japan Patent Office for corresponding Japanese Patent Application No. 2020-535586, dated Aug. 10, 2021, with an English translation.
NTT DoCoMo, "Views on beam recovery", Agenda Item: 7.2.2.4, 3GPP TSG-RAN WG1 Meeting #90b, R1-1718193, Prague, CZ, Oct. 9-13, 2017.
Huawei et al. "Handling of resources for beam failure recovery", Agenda Item: 10.2.12, 3GPP TSG-RAN WG2 Meeting #99bis, R2-1710564 (resubmission of R2-1706697), Prague, Czech Republic, Oct. 9-13, 2017.
Mediatek Inc., "Design Details on Beam Failure Recovery", Agenda Item: 7.2.2.4, 3GPP TSG-RAN WG1 Meeting #90bis, R1-1718334, Prague, Czechia, Oct. 9-13, 2017.
Ericsson, "Analysis of beam indication signalling options", 3GPP TSG-RAN WG1 Meeting 90bis, R1-1718743, Prague, CZ, Oct. 9-13, 2017.
Non-Final Office Action issued by the United States Patent and Trademark Office for corresponding U.S. Appl. No. 16/910,753, electronically delivered on Mar. 16, 2022.
Notice of Allowance issued by the United States Patent and Trademark Office for corresponding U.S. Appl. No. 16/910,753, electronically delivered on Jul. 25, 2022.

* cited by examiner

CONFIGURATION METHOD AND APPARATUS FOR BEAM FAILURE RECOVERY AND COMMUNICATION SYSTEM

CROSS REFERENCE TO RELATED APPLICATIONS

This application is a continuation application of U.S. application Ser. No. 16/910,753, filed on Jun. 24, 2020, which is a continuation application of International Application No. PCT/CN2018/071339, filed on Jan. 4, 2018, the contents of each are incorporated herein by reference.

TECHNICAL FIELD

This disclosure relates to the field of communication technologies, and in particular to a configuration method and apparatus for beam failure recovery and a communication system.

BACKGROUND

In a new radio (NR) system of the fifth generation (5G) communication, in order to support communications at higher frequencies, a concept of beam is introduced. Accordingly, the NR system supports beam-related operations, such as beam management, including beam determination, beam measurement, and beam reporting. After the introduction of the concept of beam, system resource allocation is enhanced from the original cell level to a beam level, which may possibly require more resources or more efficient resource allocation management mechanism.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that there may possibly simultaneously exist a large amount of (such as hundreds of) connected terminal equipments in a single cell, and in order to support beam failure recovery, it is currently possible that there is a need to reserve multiple dedicated configurations for each terminal equipment, which may result in large signaling overhead and relatively low resource utilization.

Embodiments of this disclosure provide a configuration method and apparatus for beam failure recovery and communication system. It is expected that signaling overhead in beam failure recovery may be reduced, and utilization of resources and/or preambles used for beam failure recovery may be improved.

According to a first aspect of the embodiments of this disclosure, there is provided a configuration method for beam failure recovery, including:

receiving configurations for beam failure recovery transmitted by a network device; wherein, the configurations at least include resource information and/or preamble information used to trigger a beam failure recovery; and removing at least a part of time resources and/or frequency resources from resources used to trigger the beam failure recovery, and/or removing at least a part of preambles from preambles used to trigger the beam failure recovery.

According to a second aspect of the embodiments of this disclosure, there is provided a configuration apparatus for beam failure recovery, including:

a receiving unit configured to receive configurations for beam failure recovery transmitted by a network device; wherein, the configurations at least include resource information and/or preamble information used to trigger a beam failure recovery; and a management unit configured to remove at least a part of time resources and/or frequency resources from resources used to trigger the beam failure recovery, and/or remove at least a part of preambles from preambles used to trigger the beam failure recovery.

According to a third aspect of the embodiments of this disclosure, there is provided a configuration method for beam failure recovery, including:

transmitting indication information to a network device; and receiving configurations for beam failure recovery transmitted by the network device.

According to a fourth aspect of the embodiments of this disclosure, there is provided a configuration apparatus for beam failure recovery, including:

a transmitting unit configured to transmit indication information to a network device; and a receiving unit configured to receive configurations for beam failure recovery transmitted by the network device.

According to a fifth aspect of the embodiments of this disclosure, there is provided a communication system, including:

a terminal equipment, including the configuration apparatus for beam failure recovery as described in the second or fourth aspect.

An advantage of the embodiments of this disclosure exists in that the terminal equipment removes at least a part of time resources and/or frequency resources from resources and/or preambles used to trigger the beam failure recovery, or the terminal equipment transmits indication information to the network device and receives configurations for beam failure recovery transmitted by the network device. Hence, there is no need to reserve multiple dedicated configurations for each terminal equipment, which may reduce signaling overhead for beam failure recovery, and improve utilization of resources and/or preambles used for beam failure recovery.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a dedicated geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Furthermore, the term "a network side" or "a network device side" refers to a side at a network, may be a base station, and may include one or more of the above network devices. And the term "a user equipment side" or "a terminal equipment side" refers to a side at a user equipment or a terminal equipment, may be a user equipment, and may include one or more of the above terminal equipments.

Scenarios in the embodiments of this disclosure shall be described below by way of examples; however, this disclosure is not limited thereto.

Figure 1:
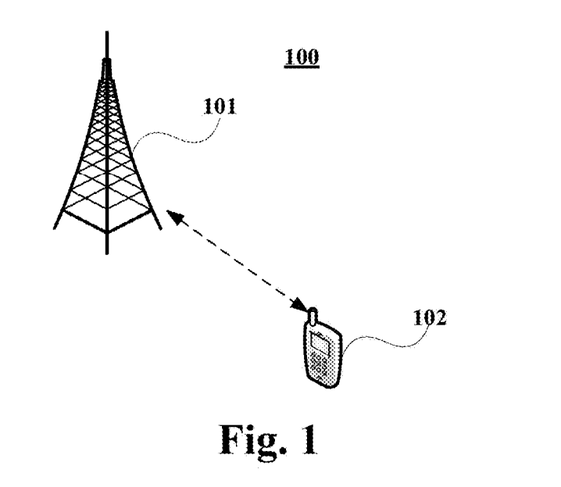
FIG. 1 is a schematic diagram of a communication system of an embodiment of this disclosure.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. An example having one terminal equipment and a network device is schematically given in FIG. 1; however, the embodiment of this disclosure is not limited thereto.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communication (MTC), and ultra-reliable and low-latency communication (URLLC).

An autonomous recovery mechanism of a terminal equipment (also referred to as a user equipment), i.e., a beam failure recovery mechanism, is introduced in the NR system. For example, after the terminal equipment enters a connected state, the network device will provide dedicated configurations for the terminal equipment. According to the dedicated configurations transmitted by the network device, when a beam failure occurs and a candidate beam exists, the terminal equipment may transmit a beam failure recovery request by using a resource provided in the dedicated configurations or a contention-based resource, and wait for feedback from the network device within a reception time window provided in the dedicated configurations at a designated resource position. If the feedback of the network device is received within the reception time window, it can be considered that a beam failure recovery procedure is successful completed, otherwise, it can be considered that the beam failure recovery procedure is unsuccessful completed.

Figure 2:
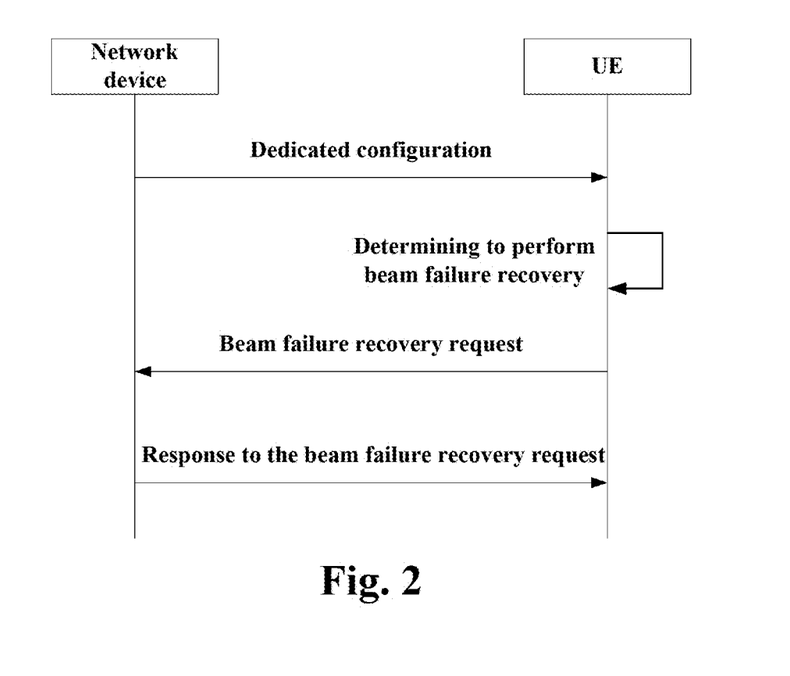
FIG. 2 is a schematic diagram of a beam failure recovery procedure of an embodiment of this disclosure.

FIG. 2 is a schematic diagram of the beam failure recovery procedure according to an embodiment of this disclosure. As shown in FIG. 2, a network device (e.g. a gNB) may transfer dedicated configurations for beam failure recovery to a terminal equipment in advance. When the terminal equipment triggers a beam failure recovery procedure, it transmits a beam failure recovery request to the network device, and receives a response from the network device to the request.

The dedicated configurations provided by the network device for the terminal equipment may include, for example, at least one of the following:

a parameter for determining beam failure, such as NrOf-BeamFailureInstance;

a threshold used to acknowledge whether a beam is a candidate beam, such as CandidateBeamThreshold;

a resource used to random access transmitting a beam failure recovery request, such as PRACH-resource-dedicated-BFR;

a preamble index used to transmit a beam failure recovery request, such as ra-PreambleIndexConfig-BFR;

a limit to transmitting a beam failure recovery request, such as Preamble Trans Max-BFR;

configuration information used to receive a response from a network device, such as ResponseWindowSize-BFR and Beam-Failure-Recovery-Response-CORESET It should be noted that the dedicated configurations used for beam failure recovery is illustrated above. However, this disclosure is not limited thereto; for example, other parameters may also be included, and reference may be made to related techniques for the dedicated configurations used for beam failure recovery, which shall not be described herein any further.

The embodiments of this disclosure shall be described below by taking an NR system as an example; however, this disclosure is not limited thereto, and may also be applicable to any systems in which similar problems exist.

Embodiment 1

The embodiments of this disclosure provide a configuration method for beam failure recovery.

Figure 3:
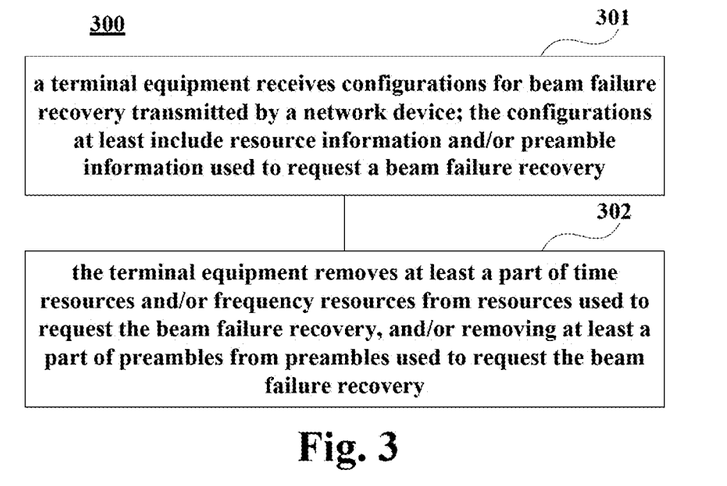
FIG. 3 is a schematic diagram of the configuration method for beam failure recovery of Embodiment 1 of this disclosure.

FIG. 3 is a schematic diagram of the configuration method for beam failure recovery of the embodiment of this disclosure, in which a case at a terminal equipment side is shown. As shown in FIG. 3, a configuration method 300 for beam failure recovery includes:

step 301: a terminal equipment receives configurations for beam failure recovery transmitted by a network device; the configurations at least include resource information and/or preamble information used to trigger a beam failure recovery; and step 302: the terminal equipment removes at least a part of time resources and/or frequency resources from resources used to trigger the beam failure recovery, and/or removing at least a part of preambles from preambles used to trigger the beam failure recovery.

In an embodiment, the terminal equipment may receive the dedicated configuration transmitted by the network device, and may remove (or discard, clear, release, etc.) at least a part from the dedicated configurations, or may consider that at least a part of the dedicated configurations are not used.

For example, it may autonomously remove or discard part or all of time resources and/or frequency resources (hereinafter referred to as time frequency resources) from available resources, and/or autonomously remove or discard part or all of preambles from available preambles. Therefore, there is no need to reserve multiple dedicated configurations for each terminal equipment, which may reduce signaling overhead in beam failure recovery and improve utilization of time frequency resources and/or preambles for beam failure recovery.

In one embodiment, the terminal equipment performs the autonomous removal when beam failure recovery is successfully completed.

Figure 4:
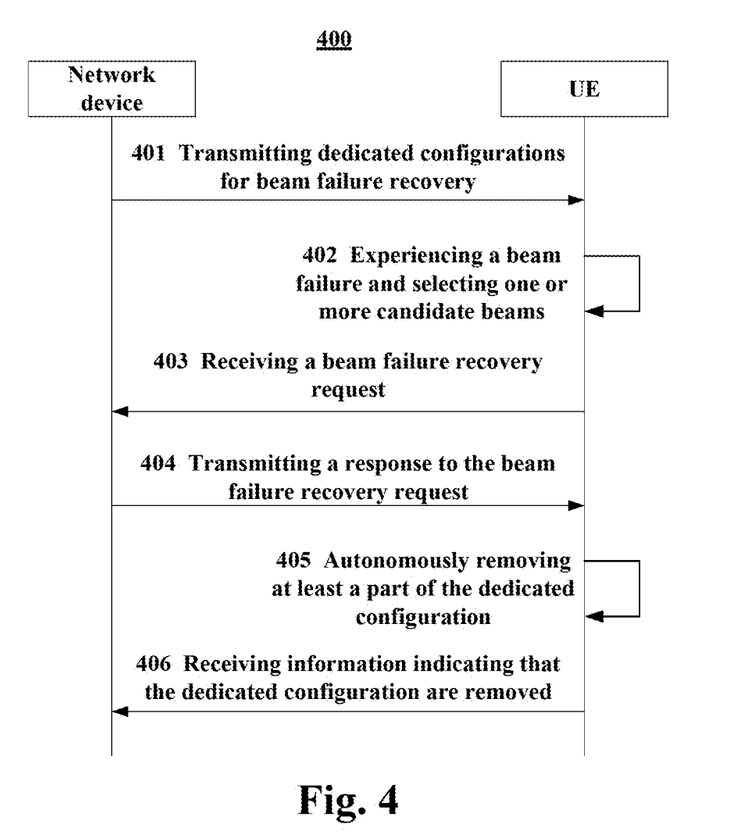
FIG. 4 is another schematic diagram of the configuration method for beam failure recovery of Embodiment 1 of this disclosure.

FIG. 4 is another schematic diagram of the configuration method for beam failure recovery of the embodiment of this disclosure, in which a case at the terminal equipment side and a network device side is shown. As shown in FIG. 4, a configuration method 400 for beam failure recovery includes:

step 401: the network device transmits dedicated configurations for beam failure recovery to the terminal equipment; the dedicated configurations at least include time frequency resource information and/or preamble information used to trigger a beam failure recovery.

step 402: the terminal equipment experiences a beam failure and selects one or more candidate beams;

step 403: the terminal equipment transmits a beam failure recovery request to the network device by using dedicated configurations to which the one or more candidate beams correspond;

step 404: the terminal equipment receives a response of the network device to the beam failure recovery request;

for example, within a specified reception time window, the terminal equipment successfully receives feedback from the network device, and the beam failure recovery procedure is considered as being successful completed; the feedback is, for example, a physical downlink control channel (PDCCH) carrying an uplink grant or downlink allocation; however, this disclosure is not limited thereto;

step 405: the terminal equipment autonomously removes at least a part of the dedicated configuration for beam failure recovery;

for example, time resources and/or frequency resources to which one or more candidate beams becoming service beams correspond are removed or discarded from available resources;

step 406: the terminal equipment transmits information indicating that resources and/or preambles are removed to the network device.

It should be noted that FIG. 4 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4.

Thus, the terminal equipment autonomously removes a part or all of the dedicated configurations, which may reduce overhead and improve resource utilization. In addition, the terminal equipment reports information on removal to the network device, and an agreement may be reached between the terminal equipment and the network device, thereby further improving resource utilization.

In another embodiment, when the beam failure recovery is unsuccessful completed, time resources and/or frequency resources in the dedicated configurations used to trigger the beam failure recovery may be released from the available resources, and/or, when the beam failure recovery is unsuccessful completed, preambles used to trigger the beam failure recovery in the dedicated configurations may be removed from the available preambles.

For example, if the terminal equipment does not receive feedback from the network device within the specified reception time window in step 404, the beam failure recovery procedure is deemed as being unsuccessful (i.e., failing), in which case the terminal equipment may deem that the one or more candidate beams selected in step 402 are no longer appropriate, and therefore may autonomously remove or discard the time frequency resources and/or the preambles to which the one or more candidate beams correspond.

In another embodiment, the terminal equipment may also determine one or more candidate beams according to a measurement result. In a case where one or more beams are determined to be no longer candidate beams, time resources and/or frequency resources to which the one or more beams correspond are removed from the available resources, and/or, in a case where one or more beams are determined to be no longer candidate beams, preambles to which the one or more beams correspond are removed from the available preambles.

In another embodiment, the terminal equipment may also perform autonomous removal by using a timer. One or more timers may be set for the terminal equipment; and the one or more timers are started when configuration information of the timers is received by the terminal equipment.

For example, in a case where one or more timers expire, time resources and/or frequency resources to which the one or more timers correspond are removed from the available resources, and/or in a case where the one or more timers expire, preambles to which the one or more timers correspond are removed from the available preambles.

For example, a timer may be configured for the terminal equipment, that is, the timer is applicable to the entire terminal equipment. Alternatively, a timer may be configured for a set of time resources and/or frequency resources and/or preambles, that is, the timer is applicable to a set of resources and/or preambles. Alternatively, a timer may be configured for a group of sets of time resources and/or frequency resources and/or preambles, that is, the timer is applicable to a group (multiple) of sets of resources and/or preambles.

In an embodiment, the terminal equipment may also receive indication information transmitted by the network device used for restarting or stopping the one or more timers. The indication information may be carried in a media access control (MAC) control element (CE) and/or a physical downlink control channel (PDCCH); however, this disclosure is not limited thereto.

In the above embodiments, only the conditions for autonomous removal of this disclosure are schematically described; however, this disclosure is not limited thereto. In addition, for the sake of simplicity, some steps are omitted, and reference may be made to FIG. 4 similarly; for example, a step of reporting by the terminal equipment to the network device may be added.

Furthermore, it should be noted that the above embodiments may be implemented independently, or may be implemented by combining two or more thereof, which shall be illustrated below by way of examples.

For example, when the network device provides a terminal equipment with dedicated configurations for beam failure recovery. After beam failure recovery of the terminal equipment is successfully completed and an original candidate beam 1 becomes a current serving beam, the terminal equipment may autonomously remove a time frequency resource and/or a preamble to which beam 1 corresponds from the dedicated configurations. Moreover, if radio quality of an original candidate beam 2 deteriorates and thus it is no longer a candidate beam, the terminal equipment may also autonomously remove a time frequency resource and/or a preamble to which beam 2 corresponds from the dedicated configurations.

For another example, the network device provides dedicated configurations for beam failure recovery for a terminal equipment, and sets valid timers T1, T2 and T3 for configuration 1, configuration 2 and configuration 3, respectively. When the terminal equipment receives the dedicated configurations, it may start the valid timers T1, T2 and T3 for corresponding configurations. Furthermore, the network device may transmit an MAC CE to indicate the timers, such as only restarting T1 and T2, but not restarting T3; that is, the network device considers that a candidate beam to which configuration 3 corresponds is no longer needed. In this way, in a case where T1 and T2 are restarted and T3 expires, the terminal equipment may remove configuration 3 by itself. Moreover, after the beam failure recovery is successful completed, the original candidate beam 1 becomes the current serving beam, and the terminal equipment may further autonomously remove a time frequency resource and/or a preamble to which beam 1 corresponds from the dedicated configurations.

It can be seen that the terminal equipment may autonomously remove or release the resources and/or preambles of the dedicated configurations. In this way, validity of the resources and/or the preambles in the dedicated configurations may be controlled, and the resources and/or preambles in the dedicated configurations may be utilized more efficiently at lower signaling overhead.

Embodiment 2

The embodiments of this disclosure provide a configuration method for beam failure recovery.

Figure 5:
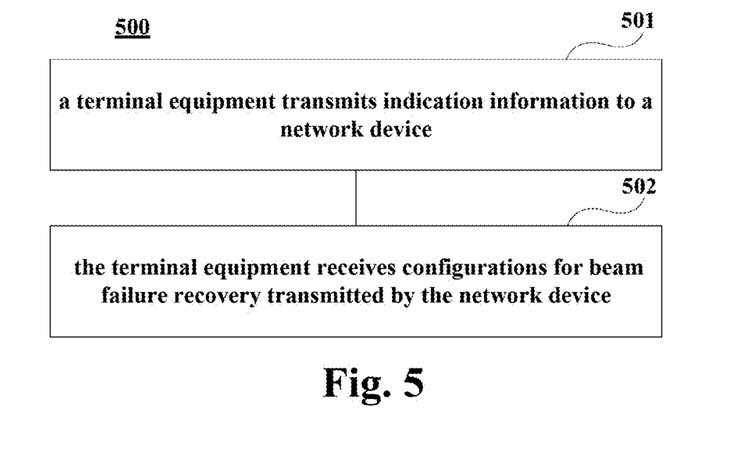
FIG. 5 is a schematic diagram of the configuration method for beam failure recovery of Embodiment 2 of this disclosure.

FIG. 5 is a schematic diagram of the configuration method for beam failure recovery of the embodiment of this disclosure, in which a case at a terminal equipment side is shown. As shown in FIG. 5, a configuration method 500 for beam failure recovery includes:

step 501: a terminal equipment transmits indication information to a network device; and step 502: the terminal equipment receives configurations for beam failure recovery transmitted by the network device.

In an embodiment, the indication information is used by the network device to determine the configurations for beam failure recovery, the configurations at least including resource information and/or preamble information used to trigger a beam failure recovery; however, this disclosure is not limited thereto.

Figure 6:
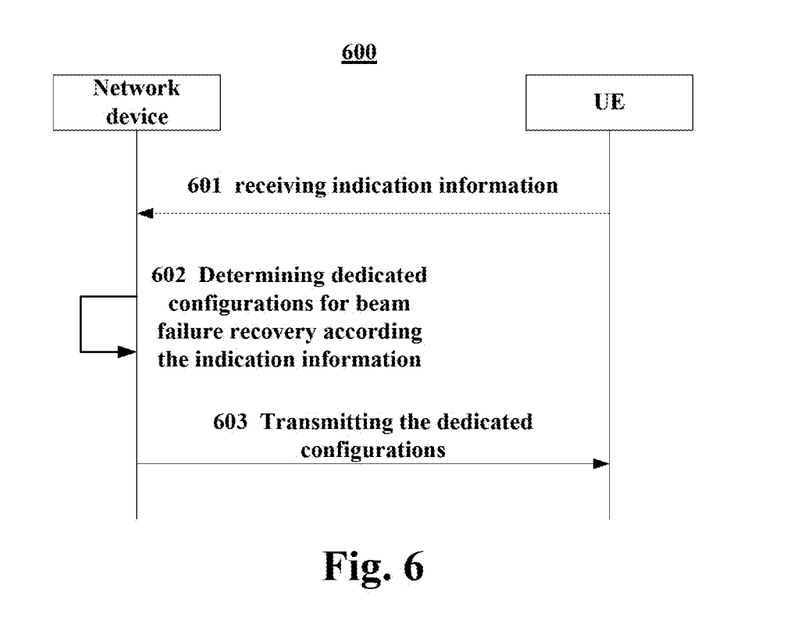
FIG. 6 is another schematic diagram of the configuration method for beam failure recovery of Embodiment 2 of this disclosure.

FIG. 6 is another schematic diagram of the configuration method for beam failure recovery of the embodiment of this disclosure, in which a case at a terminal equipment side and a network device side is shown. As shown in FIG. 6, a configuration method 600 for beam failure recovery includes:

step 601: a terminal equipment transmits indication information to a network device;

step 602: the network device determines dedicated configurations for beam failure recovery according the indication information transmitted by the terminal equipment; and step 603: the terminal equipment receives the dedicated configurations transmitted by the network device.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

Thus, the network device may decide whether to provide the terminal equipment with dedicated configurations and what kind of dedicated configurations are to be provided according to the information provided by the terminal equipment, thereby more efficiently using the resources and/or the preambles.

In an embodiment, the indication information may at least include one of the following: information on capabilities that have been used by the terminal equipment, information on remaining capabilities of the terminal equipment, preference information of the terminal equipment, level information of the terminal equipment, priority information of the terminal equipment, information indicating the terminal equipment to determine that a beam failure possibly occurs, and mobility state information of the terminal equipment.

For example, the information on capabilities that have been used by the terminal equipment includes: measurement capabilities that have been used by the terminal equipment currently; and the information on remaining capabilities of the terminal equipment includes: measurement capabilities being used by the terminal equipment currently obtained based on a maximum permitted measurement ability and the measurement capabilities that have been used currently.

For another example, the terminal equipment may determine that a beam failure possibly occurs according to a predefined or preconfigured condition. The predefined or preconfigured condition includes at least one of the following: measurement results of multiple serving beams within a period of time being all less than a predefined measurement threshold, the number of serving beams having measurement results greater than the measurement threshold being less than a predefined number threshold, and multiple consecutive measurement results of multiple serving beams being all less than the measurement threshold.

In an embodiment, the terminal equipment may further set a timer used for prohibiting transmitting the indication information; the timer is started when the terminal equipment transmits the indication information to the network device, and the indication information is permitted to be transmitted when the timer expires or is not started.

The embodiments of this disclosure shall be further illustrated below by way of three examples; however, this disclosure is not limited thereto.

For example, after a UE enters a connected state, UE information may be transmitted to the network device via a UE capability transfer procedure. When the UE receives a UE capability acquisition message transmitted by the network device, the UE will construct and transmit a UE capability information message, a content of which including a capability that has been used by the UE or a remaining capability of the UE or a UE level. For example, the UE capability information includes: the number of measurement objects that have been used or are being maintained or measurement IDs or report configurations in current measurement configuration variables, or remaining amounts of these parameters. According to the UE capability information, the network device may determine the number of candidate beams configured for the UE.

For another example, after a UE enters a connected state, it may transmit UE information to the network device via a radio resource control (RRC) message. For example, in order to convey UE preference or priority information, a new message similar to an interest indication message of multimedia broadcast multicast service (MBMS) may be introduced; and the message may include: information on preference of the UE of whether to perform beam failure recovery or not, and beam information on preference of the UE of performing beam failure recovery, etc. For a further example, in order to convey indication information that beam failure may possibly occur in the UE, a new message similar to an in-device coexistence indication message may be introduced; and the message may include: information of a serving beam with a measurement result lower than a threshold, and so on.

For yet another example, it may be specified in a protocol that when channel state information reference signal (CSI-RS) measurement results of 50% of serving beams are less than a threshold TH, it is considered that beam failure may possibly occur in a UE. For example, if the UE currently has 4 serving beams, when CSI-RS measurement results of 2 serving beams are less than the threshold TH, the UE transmits a report to the network device; and the report may include: an indication that beam failure may possibly occur in the UE, the number of current measurement layers the UE, and high priority indication. Based on the report of the UE, the network device may provide the UE with dedicated configurations for beam failure recovery. And if the report includes a low priority indication, the network device may not provide a dedicated configuration for the UE.

It can be seen from the above embodiments that the terminal equipment may transmit the indication information to the network device, and according to the information provided by the terminal equipment, the network device may decide whether to provide the terminal equipment with dedicated configurations and what kind of dedicated configurations are to be provided, thereby more efficiently using the resources and/or the preambles.

Embodiment 3

The embodiments of this disclosure provide a configuration apparatus for beam failure recovery. The apparatus may be, for example, a terminal equipment, or may be one or more components or assemblies configured in a terminal equipment. Contents in Embodiment 3 identical to those in Embodiment 1 shall not be described herein any further.

Figure 7:
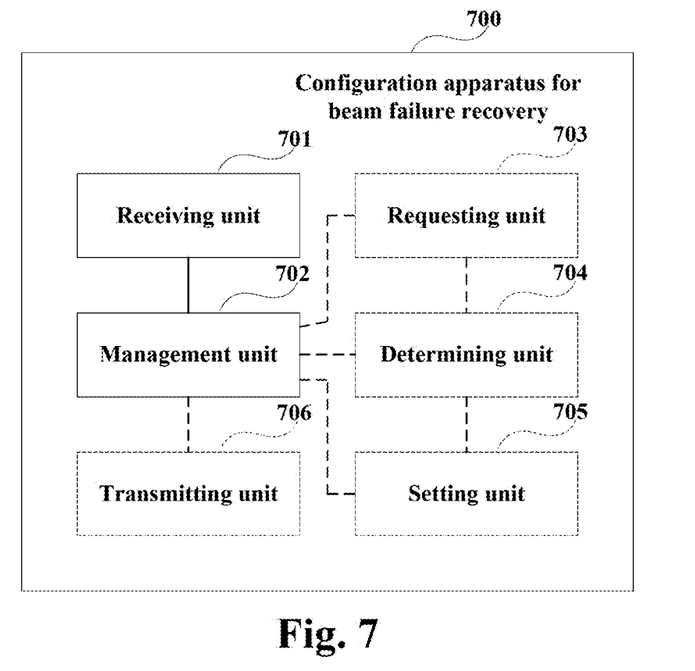
FIG. 7 is a schematic diagram of the configuration apparatus for beam failure recovery of Embodiment 3 of this disclosure.

FIG. 7 is a schematic diagram of the configuration apparatus for beam failure recovery of the embodiment of this disclosure. As shown in FIG. 7, a configuration apparatus 700 for beam failure recovery includes:

a receiving unit 701 configured to receive configurations for beam failure recovery transmitted by a network device; the configurations at least include resource information and/or preamble information used to trigger a beam failure recovery; and a management unit 702 configured to remove (or discard, and so on) at least a part of time resources and/or frequency resources from resources used to trigger the beam failure recovery, and/or remove (or discard, and so on) at least a part of preambles from preambles used to trigger the beam failure recovery.

In one embodiment, as shown in FIG. 7, the configuration apparatus 700 for beam failure recovery may further include:

a requesting unit 703 configured to transmit a beam failure recovery request to the network device by using configurations to which one or more candidate beams correspond.

And the management unit 702 may be configured to: remove (or discard, and so on) time resources and/or frequency resources to which one or more candidate beams becoming a serving beam/serving beams correspond(s) from available resources when the beam failure recovery is successfully performed, and/or remove (or discard, and so on) preambles to which one or more candidate beams becoming a serving beam/serving beams correspond(s) from available preambles when the beam failure recovery is successfully performed.

In another embodiment, the management unit 702 may be configured to: release time resources and/or frequency resources of the configurations used to trigger the beam failure recovery from available resources when the beam failure recovery is unsuccessful, and/or remove preambles of the configurations used to trigger the beam failure recovery from available preambles when the beam failure recovery is unsuccessful.

In one embodiment, as shown in FIG. 7, the configuration apparatus 700 for beam failure recovery may further include:

a determining unit 704 configured to determine one or more candidate beams according to a measurement result.

And the management unit 702 may be configured to: remove time resources and/or frequency resources to which one or more beams correspond(s) from available resources when the one or more beams is/are determined as being candidate beam(s) no longer, and/or remove preambles to which one or more beams correspond(s) from available preambles when the one or more beams is/are determined as being candidate beam(s) no longer.

In one embodiment, as shown in FIG. 7, the configuration apparatus 700 for beam failure recovery may further include:

a setting unit 705 configured to set one or more timers for the terminal equipment; and wherein, the one or more timers is/are started when configuration information on the timer(s) is received by the terminal equipment.

And the management unit 702 may be configured to: remove time resources and/or frequency resources to which the one or more timers correspond(s) from available resources when the one or more timers expire(s), and/or remove preambles to which the one or more timers correspond(s) from available preambles when the one or more timers expire(s).

For example, the terminal equipment may be configured with a timer, or a set of time resources and/or frequency resources and/or preambles may be configured with a timer, or a group of sets of time resources and/or frequency resources and/or preambles may be configured with a timer.

In one embodiment, the receiving unit 701 may further be configured to: receive indication information used for restarting or stopping the one or more timers and transmitted by the network device; wherein the indication information may be carried by a medium access control (MAC) control element (CE) and/or a physical downlink control channel (PDCCH). And the terminal equipment may correspondingly restart or stop the timer according to the indication information.

In one embodiment, as shown in FIG. 7, the configuration apparatus 700 for beam failure recovery may further include:

a transmitting unit 706 configured to transmit information indicating that resources and/or preambles are removed, to the network device.

The embodiment of this disclosure further provides a configuration apparatus for beam failure recovery. The apparatus may be, for example, a network device, or may be one or more components or assemblies configured in a network device.

Figure 8:
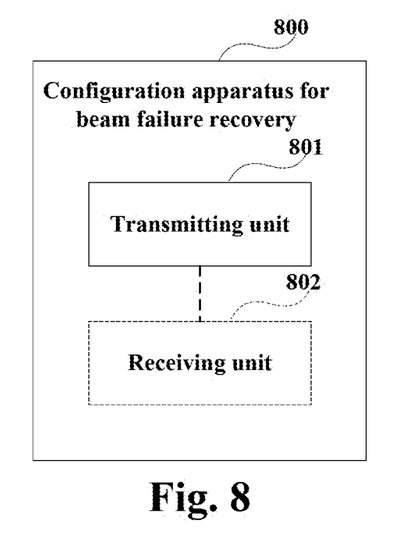
FIG. 8 is another schematic diagram of the configuration apparatus for beam failure recovery of Embodiment 3 of this disclosure.

FIG. 8 is a schematic diagram of the configuration apparatus for beam failure recovery of the embodiment of this disclosure. As shown in FIG. 8, a configuration apparatus 800 for beam failure recovery includes:

a transmitting unit 801 configured to transmit configurations for beam failure recovery transmitted to a terminal equipment; the configurations at least include resource information and/or preamble information used to trigger a beam failure recovery.

As shown in FIG. 8, the configuration apparatus 800 for beam failure recovery may further include:

a receiving unit 802 configured to receive a beam failure recovery request transmitted by the terminal equipment by using configurations to which one or more candidate beams correspond.

In one embodiment, the transmitting unit 801 may further be configured to transmit indication information used for restarting or stopping one or more timers to the terminal equipment.

In one embodiment, the receiving unit 802 may further be configured to receive information transmitted by the terminal equipment indicating that resources and/or preambles are removed.

It should be noted that the components or modules related to this disclosure are only described above. However, this disclosure is not limited thereto, and the configuration apparatus 700 or 800 for beam failure recovery may further include other components or modules, and reference may be made to related techniques for particulars of these components or modules.

Furthermore, for the sake of simplicity, connection relationships between the components or modules or signal profiles thereof are only illustrated in FIG. 7 or 8. However, it should be understood by those skilled in the art that such related techniques as bus connection, etc., may be adopted. And the above components or modules may be implemented by hardware, such as a processor, a memory, a transmitter, and a receiver, which are not limited in the embodiment of this disclosure.

It can be seen from the above embodiments that the terminal equipment may autonomously remove or release the resources and/or preambles of the dedicated configurations. In this way, validity of the resources and/or the preambles in the dedicated configurations may be controlled, and the resources and/or preambles in the dedicated configurations may be utilized more efficiently at lower signaling overhead.

Embodiment 4

The embodiments of this disclosure provide a configuration apparatus for beam failure recovery. The apparatus may be, for example, a terminal equipment, or may be one or more components or assemblies configured in a terminal equipment. Contents in Embodiment 4 identical to those in Embodiment 2 shall not be described herein any further.

Figure 9:
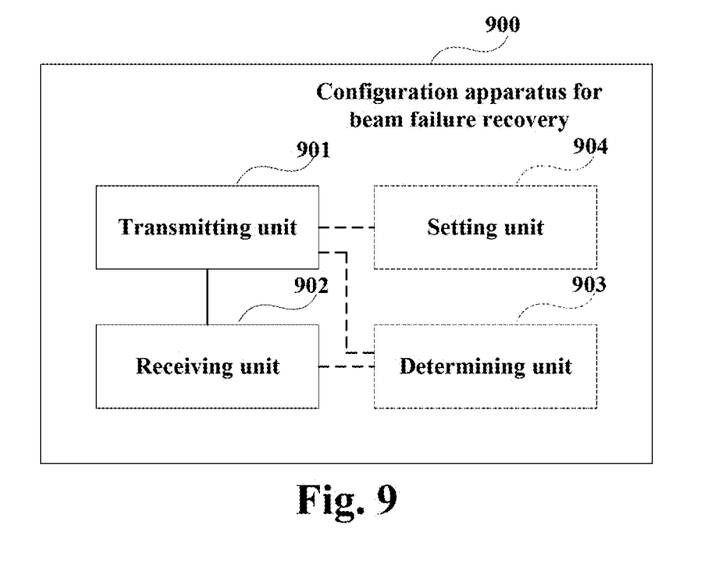
FIG. 9 is a schematic diagram of the configuration apparatus for beam failure recovery of Embodiment 4 of this disclosure.

FIG. 9 is a schematic diagram of the configuration apparatus for beam failure recovery of the embodiment of this disclosure. As shown in FIG. 9, a configuration apparatus 900 for beam failure recovery includes:

a transmitting unit 901 configured to transmit indication information to a network device; and a receiving unit 902 configured to receive configurations for beam failure recovery transmitted by the network device.

In an embodiment, the indication information is used by the network device to determine the configurations for beam failure recovery, the configurations at least including resource information and/or preamble information used to trigger a beam failure recovery; however, this disclosure is not limited thereto.

In an embodiment, the indication information at least includes one of the following: information on capabilities that have been used by the terminal equipment, information on remaining capabilities of the terminal equipment, preference information of the terminal equipment, level information of the terminal equipment, priority information of the terminal equipment, information indicating the terminal equipment to determine that a beam failure possibly occurs, and mobility state information of the terminal equipment.

For example, the information on capabilities that have been used by the terminal equipment includes: measurement capabilities that have been used by the terminal equipment currently; and the information on remaining capabilities of the terminal equipment includes: measurement capabilities being used by the terminal equipment currently obtained based on a maximum permitted measurement ability and the measurement capabilities that have been used currently.

In one embodiment, as shown in FIG. 9, the configuration apparatus 900 for beam failure recovery may further include:

a determining unit 903 configured to determine that a beam failure possibly occurs according to a predefined or preconfigured condition;

wherein, the predefined or preconfigured condition includes at least one of the following: measurement results of multiple serving beams within a period of time being all less than a predefined measurement threshold, the number of serving beams having measurement results greater than the measurement threshold being less than a predefined number threshold, and multiple consecutive measurement results of multiple serving beams being all less than the measurement threshold.

In one embodiment, as shown in FIG. 9, the configuration apparatus 900 for beam failure recovery may further include:

a setting unit 904 configured to set a timer used for prohibiting transmitting the indication information.

The timer is started when the transmitting unit 901 transmits the indication information to the network device, and the indication information is permitted to be transmitted when the timer expires or is not started.

The embodiment of this disclosure further provides a configuration apparatus for beam failure recovery. The apparatus may be, for example, a network device, or may be one or more components or assemblies configured in a network device.

Figure 10:
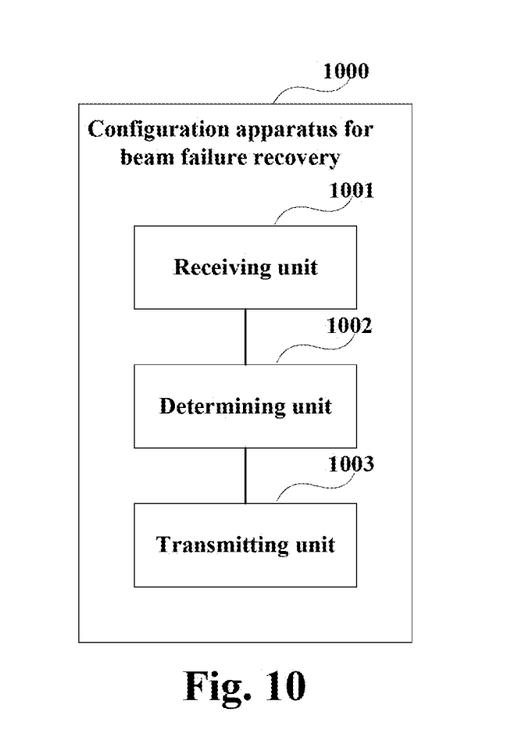
FIG. 10 is another schematic diagram of the configuration apparatus for beam failure recovery of Embodiment 4 of this disclosure.

FIG. 10 is a schematic diagram of the configuration apparatus for beam failure recovery of the embodiment of this disclosure. As shown in FIG. 10, a configuration apparatus 1000 for beam failure recovery includes:

a receiving unit 1001 configured to receive indication information transmitted by a terminal equipment;

a determining unit 1002 configured to determine configurations used for beam failure recovery based on the indication information; and a transmitting unit 1003 configured to transmit the configurations used for beam failure recovery to the terminal equipment.

For example, the determining unit 1002 may allocate the configurations used for beam failure recovery for the terminal equipment according to the indication information transmitted by the terminal equipment; for example, relatively more resources may be allocated for a terminal equipment of a higher priority, and relatively few may be allocated for a terminal equipment of a lower priority, etc.

It should be noted that the components or modules related to this disclosure are only described above. However, this disclosure is not limited thereto, and the configuration apparatus 900 or 1000 for beam failure recovery may further include other components or modules, and reference may be made to related techniques for particulars of these components or modules.

Furthermore, for the sake of simplicity, connection relationships between the components or modules or signal profiles thereof are only illustrated in FIG. 9 or 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment may transmit the indication information to the network device, and according to t eh information provided by the terminal equipment, the network device may decide whether to provide the terminal equipment with dedicated configurations and what kind of dedicated configurations are to be provided, thereby more efficiently using the resources and/or the preambles.

Embodiment 5

The embodiments of this disclosure provide a communication system, and reference may be made to FIG. 1, with contents identical to those in embodiments 1-4 being not going to be described herein any further. In an embodiment, the communication system 100 may include:

a network device 101 serving for one or more terminal equipments and configured with the configuration apparatus 800 for beam failure recovery as described in Embodiment 3 or the configuration apparatus 1000 for beam failure recovery as described in Embodiment 4; and a terminal equipment 102 configured with the configuration apparatus 700 for beam failure recovery as described in Embodiment 3 or the configuration apparatus 900 for beam failure recovery as described in Embodiment 4.

The embodiment of this disclosure further provides a network device, which may be, for example, a base station. However, this disclosure is not limited thereto, and it may also be another network device.

Figure 11:
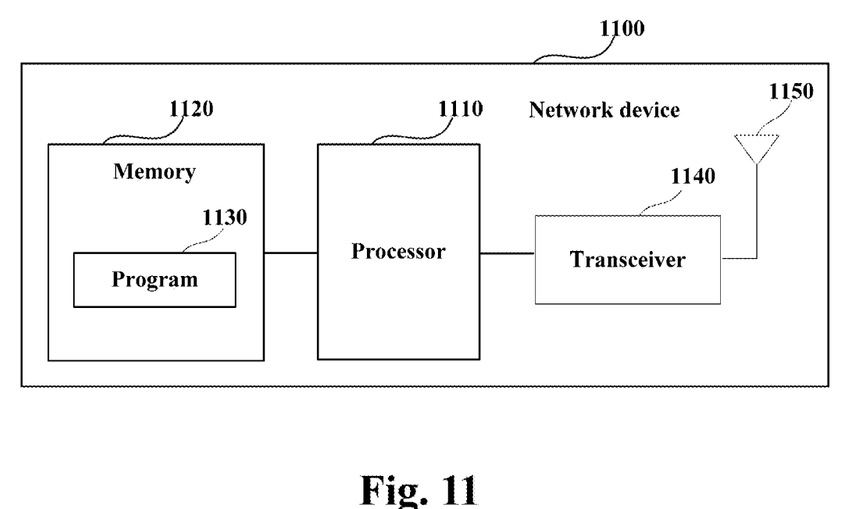
FIG. 11 is a schematic diagram of the network device of Embodiment 5 of this disclosure.

FIG. 11 is a schematic diagram of a structure of the network device of the embodiment of this disclosure. As shown in FIG. 11, a network device 1100 may include a processor 1110 (such as a central processing unit (CPU)) and a memory 1120, the memory 1120 being coupled to the processor 1110. The memory 1120 may store various data, and furthermore, it may store a program 1130 for data processing, and execute the program 1130 under control of the processor 1110.

For example, the processor 1110 may be configured to execute the program 1130 to carry out the configuration method for beam failure recovery described in Embodiment 1. For example, the processor 1110 may be configured to execute the following control: transmitting configurations for beam failure recovery to the terminal equipment; wherein the configurations at least include resource information and/or preamble information used to trigger a beam failure recovery.

In one embodiment, the processor 1110 may further be configured to execute the following control: receiving a beam failure recovery request transmitted by the terminal equipment by using configurations to which one or more candidate beams correspond.

In one embodiment, the processor 1110 may further be configured to execute the following control: transmitting indication information used for restarting or stopping one or more timers to the terminal equipment.

In one embodiment, the processor 1110 may further be configured to execute the following control: receiving information transmitted by the terminal equipment indicating that resources and/or preambles are removed.

For another example, the processor 1110 may be configured to execute the program 1130 to carry out the configuration method for beam failure recovery described in Embodiment 2. For example, the processor 1110 may be configured to execute the following control: receiving indication information transmitted by the terminal equipment; determining the configurations used for beam failure recovery according to the indication information; and transmitting the configurations to the terminal equipment.

Furthermore, as shown in FIG. 11, the network device 1100 may include a transceiver 1140, and an antenna 1150, etc. Functions of the above components are similar to those in the relevant art, and shall not be described herein any further. It should be noted that the network device 1100 does not necessarily include all the parts shown in FIG. 11, and furthermore, the network device 1100 may include parts not shown in FIG. 11, and the relevant art may be referred to.

The embodiment of this disclosure further provides a terminal equipment; however, this disclosure is not limited thereto, and it may also be another equipment.

Figure 12:
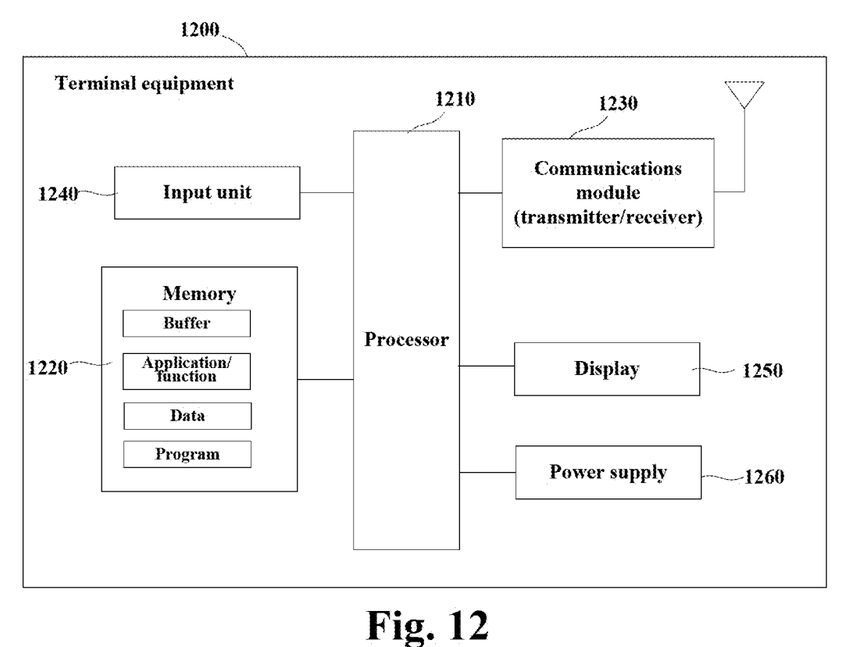
FIG. 12 is a schematic diagram of the terminal equipment of Embodiment 5 of this disclosure.

FIG. 12 is a schematic diagram of the terminal equipment of the embodiment of this disclosure. As shown in FIG. 12, a terminal equipment 1200 may include a processor 1210 and a memory 1220, the memory 1220 storing data and a program and being coupled to the processor 1210. It should be noted that his figure is illustrative only, and other types of structures may also be used, so as to supplement or replace this structure and achieve a telecommunications function or other functions.

For example, the processor 1210 may be configured to execute a program to carry out the configuration method for beam failure recovery described in Embodiment 1. For example, the processor 1210 may be configured to execute the following control: receiving configurations for beam failure recovery transmitted by a network device; the configurations at least include resource information and/or preamble information used to trigger a beam failure recovery; and removing (discarding) at least a part of time resources and/or frequency resources from resources used to trigger the beam failure recovery, and/or removing (discarding) at least a part of preambles from preambles used to trigger the beam failure recovery.

In one embodiment, the processor 1210 may further be configured to execute the following control: transmitting a beam failure recovery request to the network device by using configurations to which one or more candidate beams correspond.

In one embodiment, the processor 1210 may further be configured to execute the following control: removing (or discarding) time resources and/or frequency resources to which one or more candidate beams becoming a serving beam/serving beams correspond(s) from available resources when the beam failure recovery is successfully performed, and/or removing (or discarding) preambles to which one or more candidate beams becoming a serving beam/serving beams correspond(s) from available preambles when the beam failure recovery is successfully performed.

In one embodiment, the processor 1210 may further be configured to execute the following control: releasing time resources and/or frequency resources of the configurations used to trigger the beam failure recovery from available resources when the beam failure recovery is unsuccessful, and/or removing preambles of the configurations used to trigger the beam failure recovery from available preambles when the beam failure recovery is unsuccessful.

In one embodiment, the processor 1210 may further be configured to execute the following control: determining one or more candidate beams according to a measurement result.

In one embodiment, the processor 1210 may further be configured to execute the following control: removing time resources and/or frequency resources to which one or more beams correspond(s) from available resources when the one or more beams is/are determined as being candidate beam(s) no longer, and/or removing preambles to which one or more beams correspond(s) from available preambles when the one or more beams is/are determined as being candidate beam(s) no longer.

In one embodiment, the processor 1210 may further be configured to execute the following control: setting one or more timers for the terminal equipment; wherein the one or more timers is/are started when configuration information on the timer(s) is received by the terminal equipment.

In one embodiment, the processor 1210 may further be configured to execute the following control: removing time resources and/or frequency resources to which the one or more timers correspond(s) from available resources when the one or more timers expire(s), and/or removing preambles to which the one or more timers correspond(s) from available preambles when the one or more timers expire(s).

In one embodiment, the terminal equipment is configured with a timer, or a set of time resources and/or frequency resources and/or preambles is configured with a timer, or a group of sets of time resources and/or frequency resources and/or preambles is configured with a timer.

In one embodiment, the processor 1210 may further be configured to execute the following control: receiving indication information used for restarting or stopping the one or more timers and transmitted by the network device.

In one embodiment, the indication information is carried by a medium access control (MAC) control element (CE) and/or a physical downlink control channel (PDCCH).

In one embodiment, the processor 1210 may further be configured to execute the following control: transmitting information indicating that resources and/or preambles are removed, to the network device.

For another example, the processor 1210 may be configured to execute a program to carry out the configuration method for beam failure recovery described in Embodiment 2. For example, the processor 1210 may be configured to execute the following control: transmitting indication information to a network device; and receiving configurations for beam failure recovery transmitted by the network device.

In one embodiment, the indication information is used by the network device to determine the configurations for beam failure recovery, the configurations at least including resource information and/or preamble information used to trigger a beam failure recovery.

In one embodiment, the indication information at least includes one of the following: information on capabilities that have been used by the terminal equipment, information on remaining capabilities of the terminal equipment, preference information of the terminal equipment, level information of the terminal equipment, priority information of the terminal equipment, information indicating the terminal equipment to determine that a beam failure possibly occurs, and mobility state information of the terminal equipment.

In one embodiment, the information on capabilities that have been used by the terminal equipment includes: measurement capabilities that have been used by the terminal equipment currently; and the information on remaining capabilities of the terminal equipment includes: measurement capabilities being used by the terminal equipment currently obtained based on a maximum permitted measurement ability and the measurement capabilities that have been used currently.

In one embodiment, the processor 1210 may be configured to execute the following control: determining that a beam failure possibly occurs according to a predefined or preconfigured condition; the predefined or preconfigured condition includes at least one of the following: measurement results of multiple serving beams within a period of time being all less than a predefined measurement threshold, the number of serving beams having measurement results greater than the measurement threshold being less than a predefined number threshold, and multiple consecutive measurement results of multiple serving beams being all less than the measurement threshold.

In one embodiment, the processor 1210 may be configured to execute the following control: setting a timer used for prohibiting transmitting the indication information. The timer is started when the transmitting unit transmits the indication information to the network device, and the indication information is permitted to be transmitted when the timer expires or is not started.

As shown in FIG. 12, the terminal equipment 1200 may further include a communication module 1230, an input unit 1240, a display 1250, and a power supply 1260; functions of the above components are similar to those in the relevant art, which shall not be described herein any further. It should be noted that the terminal equipment 1200 does not necessarily include all the parts shown in FIG. 12, and the above components are not necessary. Furthermore, the terminal equipment 1200 may include parts not shown in FIG. 12, and the relevant art may be referred to.

An embodiment of this disclosure provides a computer readable program, which, when executed in a network device, will cause the network device to carry out the configuration method for beam failure recovery described in Embodiment 1 or 2.

An embodiment of this disclosure provides a storage medium, including a computer readable program, which will cause a network device to carry out the configuration method for beam failure recovery described in Embodiment 1 or 2.

An embodiment of this disclosure provides a computer readable program, which, when executed in a terminal equipment, will cause the terminal equipment to carry out the configuration method for beam failure recovery described in Embodiment 1 or 2.

An embodiment of this disclosure provides a storage medium, including a computer readable program, which will cause a terminal equipment to carry out the configuration method for beam failure recovery described in Embodiment 1 or 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

What is claimed is:

1. A network device for communicating with a terminal equipment via a communication network, comprising:
   a memory that stores a plurality of instructions; and
   processor circuitry coupled to the memory and configured to execute the instructions to:
   transmit first information including configurations for beam failure recovery and timer information to the terminal equipment;
   wherein the configurations at least include resource information and/or preamble information used to trigger a beam failure recovery in the terminal equipment, and the timer information is related to one or more timers to be started when a beam failure recovery procedure is initiated in the terminal equipment; and
   wherein the terminal equipment is configured to, when a timer among the one or more timers expire(s), release or not use time resources and/or frequency resources to which the expired timer corresponds from available resources for the beam failure recovery, and/or
   release or not use preambles for the beam failure recovery to which the expired timer corresponds from available preambles for the beam failure recovery.

2. The network device according to claim 1, wherein the processor circuitry is configured to:
   receive a beam failure recovery request transmitted from the terminal equipment using the configurations to which one or more candidate beams correspond.

3. The network device according to claim 1, wherein the processor circuitry is configured to:
   transmit indication information used for restarting or stopping the one or more timers.

4. The network device according to claim 3, wherein the indication information is carried by a medium access control (MAC) control element (CE) and/or a physical downlink control channel (PDCCH).

5. The network device according to claim 1, wherein the processor circuitry is configured to:
   receives information indicating that resources and/or preambles are released or not used from the terminal equipment.

6. A terminal equipment for communicating with a network device via a communication network, comprising:
   a memory that stores a plurality of instructions; and
   processor circuitry coupled to the memory and configured to execute the instructions to:
   receive configurations for beam failure recovery transmitted by the network device; wherein, the configurations at least include resource information and/or preamble information used to trigger a beam failure recovery; and
   set one or more timers; wherein the one or more timers is/are started in a case where beam failure recovery procedure is initiated; and
   configure resource and/or preambles for the beam failure recovery; wherein, when a timer among the one or more timers expire(s),
   release or not use time resources and/or frequency resources to which the expired timer corresponds from available resources for the beam failure recovery, and/or
   release or not use preambles for the beam failure recovery to which the expired timer corresponds from available preambles for the beam failure recovery.

7. The terminal equipment according to claim 6, wherein the processor circuitry is configured to:
   transmit a beam failure recovery request to the network device by using the configurations to which one or more candidate beams correspond.

8. The terminal equipment according to claim 7, wherein the processor circuitry is configured to:
   release or not use time resources and/or frequency resources to which one or more candidate beams becoming a serving beam/serving beams correspond(s) from available resources when the beam failure recovery is successfully completed,
   and/or release or not use preambles to which one or more candidate beams becoming a serving beam/serving beams correspond(s) from available preambles when the beam failure recovery is successfully completed.

9. The terminal equipment according to claim 7, wherein the processor circuitry is configured to:
   release or not use time resources and/or frequency resources of the configurations used to trigger the beam failure recovery from available resources when the beam failure recovery is unsuccessfully completed,
   and/or release or not use preambles of the configurations used to trigger the beam failure recovery from available preambles when the beam failure recovery is unsuccessfully completed.

10. The terminal equipment according to claim 6, wherein the processor circuitry is configured to:
    determine one or more candidate beams according to a measurement result.

11. The terminal equipment according to claim 10, wherein the processor circuitry is configured to:
    release or not use time resources and/or frequency resources to which one or more beams correspond(s) from available resources when the one or more beams is/are not comprised in the candidate beam(s), and/or release or not use preambles to which one or more beams correspond(s) from available preambles when the one or more beams is/are not comprised in the candidate beam(s).

12. The terminal equipment according to claim 6, wherein a set of time resources and/or frequency resources and/or preambles is configured with a timer, or a group of sets of time resources and/or frequency resources and/or preambles is configured with a timer.

13. The terminal equipment according to claim 6, wherein the processor circuitry is further configured to:
receive indication information used for restarting or stopping the one or more timers and transmitted by the network device.

14. The terminal equipment according to claim 13, wherein the indication information is carried by a medium access control (MAC) control element (CE) and/or a physical downlink control channel (PDCCH).

15. The terminal equipment according to claim 6, wherein the processor circuitry is further configured to:
transmit information indicating that resources and/or preambles are released or not used, to the network device.

16. A communication system, comprising:
a network device, wherein the network device transmits, first information including configurations for beam failure recovery and timer information;
a terminal equipment, wherein the terminal equipment receives the first information transmitted by the network device; wherein,
the terminal equipment,
receives configurations for beam failure recovery transmitted by the network device; wherein, the configurations at least include resource information and/or preamble information used to trigger a beam failure recovery; and
sets one or more timers; wherein the one or more timers is/are started in a case where beam failure recovery procedure is initiated; and
configures resource and/or preambles for the beam failure recovery; wherein, when a timer among the one or more timers expire(s),
releases or does not use time resources and/or frequency resources to which the expired timer corresponds from available resources for the beam failure recovery, and/or
releases or does not use preambles for the beam failure recovery to which the expired timer corresponds from available preambles for the beam failure recovery.

17. A communication system, comprising:
a network device, wherein the network device transmits first information including configurations for beam failure recovery and timer information;
a terminal equipment, wherein the terminal equipment receives the first information transmitted by the network device; wherein,
the network device,
transmits first information including configurations for beam failure recovery and timer information to the terminal equipment;
wherein the configurations at least include resource information and/or preamble information used to trigger a beam failure recovery in the terminal equipment, and the timer information is related to one or more timers to be started when a beam failure recovery procedure is initiated in the terminal equipment; and
wherein the terminal equipment, when a timer among the one or more timers expire(s), releases or does not use time resources and/or frequency resources to which the expired timer corresponds from available resources for the beam failure recovery, and/or
releases or does not use preambles for the beam failure recovery to which the expired timer corresponds from available preambles for the beam failure recovery.

* * * * *